United States Patent [19]
Knowles

[11] Patent Number: 5,380,959
[45] Date of Patent: Jan. 10, 1995

[54] CONTROLLER FOR AN ACOUSTIC TOUCH PANEL

[75] Inventor: Terence J. Knowles, Hanover Park, Ill.

[73] Assignee: Carroll Touch, Inc., Round Rock, Tex.

[21] Appl. No.: 898,281

[22] Filed: Jun. 15, 1992

[51] Int. Cl.⁶ .............................................. G08C 21/00
[52] U.S. Cl. ......................................... 178/18; 178/19; 345/177
[58] Field of Search ............................ 178/18, 19, 20; 340/706, 712; 345/177

[56] References Cited

U.S. PATENT DOCUMENTS

| | | | |
|---|---|---|---|
| 3,683,327 | 6/1972 | Johson et al. | 178/18 |
| 3,882,831 | 5/1975 | Williamson et al. | 333/30 |
| 4,644,100 | 2/1987 | Brenner et al. | 178/18 |
| 4,746,914 | 5/1988 | Adler | 178/18 |
| 4,791,416 | 12/1988 | Adler | 178/18 |
| 4,880,665 | 11/1989 | Adler | 427/126.3 |
| 5,072,427 | 10/1941 | Knowles | 178/18 |
| 5,177,327 | 1/1993 | Knowles | 178/18 |

OTHER PUBLICATIONS

IEEE (Electron Letters), Dieulesaint et al., 30 Oct. 1991, Entire Document.

Primary Examiner—Stephen Chin
Assistant Examiner—Paul Loomis
Attorney, Agent, or Firm—McAndrews, Held & Malloy, Ltd.

[57] ABSTRACT

A controller for an acoustic wave touch panel includes a signal conditioning circuit that can generate X-axis and Y-axis burst drive signals for a touch panel as well as receive and process X-axis and Y-axis sense signals from a touch panel that can be configured with either one or two transducers per sense axis. The signal conditioning circuit includes a differential amplifier to which simultaneously received X-axis and Y-axis sense signals are applied to provide common mode rejection. The signal conditioning circuit includes a resonant circuit, in each of the X and Y channels, that forms a series resonant circuit through which a burst signal is applied to generate the transducer drive signal. The resonant circuit further forms a parallel resonant circuit of high impedance.

7 Claims, 9 Drawing Sheets

CONTROLLER FOR AN ACOUSTIC TOUCH PANEL

TECHNICAL FIELD

The present invention is directed to a controller for an acoustic wave touch panel and more particularly to such a controller having a signal conditioning circuit through which a drive signal is applied to the acoustic wave touch panel and through which X and Y axis sense signals received from the touch panel are processed utilizing common mode rejection.

BACKGROUND OF THE INVENTION

Known acoustic wave touch panels have included a substrate and X and Y axis transmitting transducers mounted thereon to impart acoustic waves for propagation in the substrate. The acoustic waves imparted into the substrate are reflected, by respective X and Y axis reflective arrays, along a number of substantially parallel paths that extend across a touch area of the substrate to second, respective X and Y axis reflective arrays. These latter arrays reflect the acoustic waves incident thereto to respective X and Y receiving transducers mounted on the substrate. Other known acoustic touch panels utilize only one transceiving transducer and one associated reflective array per axis. More particularly, each of these transducers functions to impart an acoustic wave into the substrate for reflection by an associated array along a number of substantially parallel paths across the touch surface of the panel to a reflective edge of the substrate or a reflective grating disposed therein. The reflective edge or grating reflects the acoustic waves incident thereto back across the touch surface of the panel to the associated reflective array which in turn reflects the waves back to the transducer for sensing.

Controllers are provided for these types of acoustic wave touch panels for generating drive signals to be applied to the X and Y axis transmitting transducers; for receiving and amplifying the X and Y axis sense signals from the transducers; and for determining the coordinate of a touch on the panel from the respective X and Y axis sense signals. Heretofore known touch panels have included gates, switches or the like disposed between the transducers and the amplifier stages of the controller to prevent signals from both the X and Y axis transducers from being simultaneously received. More particularly, these controllers operate to first apply a burst drive signal to one of the transmitting transducers, the X axis transducer for example. Then the controller controls the gate or switch to couple the signal received from only the X-axis transducer to an amplification stage. After the X-axis signal is processed, the controller applies a burst drive signal to the Y-axis transducer and thereafter switches the gate to couple the signal received from only the Y axis transducer to the amplification stage. The gate to prevent the X axis and Y axis transducer signals from being received simultaneously, was thought necessary to obtain signals from which touch coordinates could be obtained. This is because it was thought that when acoustic waves were imparted into the substrate from one axis, spurious waves would be picked up by the transducer associated with the other axis. It was thought that the spurious acoustic waves would result in a transducer sense signals of sufficient magnitude to prevent the simultaneous receipt and processing of the X-axis and Y-axis signals. However, it has further been found that the position of the gate or switch with respect to the amplifier stage creates great problems with noise to make processing of the sense signals and recognition of a touch from the received sense signals difficult.

SUMMARY OF THE INVENTION

In accordance with the present invention, the disadvantages of prior controllers for acoustic wave touch panels as discussed above have been overcome. The controller of the present invention includes a signal conditioning circuit through which a drive signal is applied to the acoustic wave touch panel and through which X and Y axis sense signals are received from the touch panel and processed utilizing common mode rejection.

More particularly, the signal conditioning circuit of the present invention includes a burst generator that is coupled to the transducers of the touch panel to apply respective drive signals to the X-axis and Y-axis transmitting transducers, one at a time. The signal conditioning circuit simultaneously receives a sensed X-axis signal and a sensed Y-axis signal from the respective X-axis and Y-axis receiving transducers and applies the sense signals from both axes to a differential device. The differential device subtracts the sense signal associated with one axis from the sense signal associated with the other axis to provide a difference signal that corresponds to the sensed acoustic wave propagating relative to the axis associated with the one driven transducer to allow a touch coordinate for that axis to be determined. The common mode rejection provided by the differential device substantially eliminates both noise from the circuitry and spurious acoustic waves in the touch panel that are picked up by both the X and Y axis receiving transducers of the touch panel.

The signal conditioning circuit also includes a resonant circuit that is disposed in both the X-axis and Y-axis circuit channels. More particularly, this resonant circuit in each channel is disposed between the channel's transceiver and the channel's means for receiving the sense signal from the transceiver where the resonant circuit forms a series resonant circuit through which the drive signal is applied to the transceiver during a drive signal generation mode of operation and the resonant circuit forming a parallel resonant circuit of high impedance during the sensed signal receipt mode of operation.

The controller of the present invention is suitable for use with touch panels utilizing four transducers, i.e. an X-axis transmitting transducer, X-axis receiving transducer, Y-axis transmitting transducer and Y-axis receiving transducer as well as touch panels utilizing only one transducer per axis, i.e. an X-axis transceiver type of transducer and a Y-axis transceiver type of transducer. It is also noted that the controller of the present invention is suitable for touch panels utilizing various types of acoustic waves including Shear waves, Surface or Rayleigh waves, Lamb waves, etc.

The signal conditioning circuit of the controller of the present invention eliminates the need for a gate or switch prior to the amplification stage and provides X axis and Y axis signals that are relative free from noise so as to enable the detection of a touch position from these signals to be accomplished accurately and easily. These and other objects and advantages of the present invention as well as details of an illustrated embodiment

DETAILED DESCRIPTION OF THE PREFERRED EMBODIMENT

Figure 1:
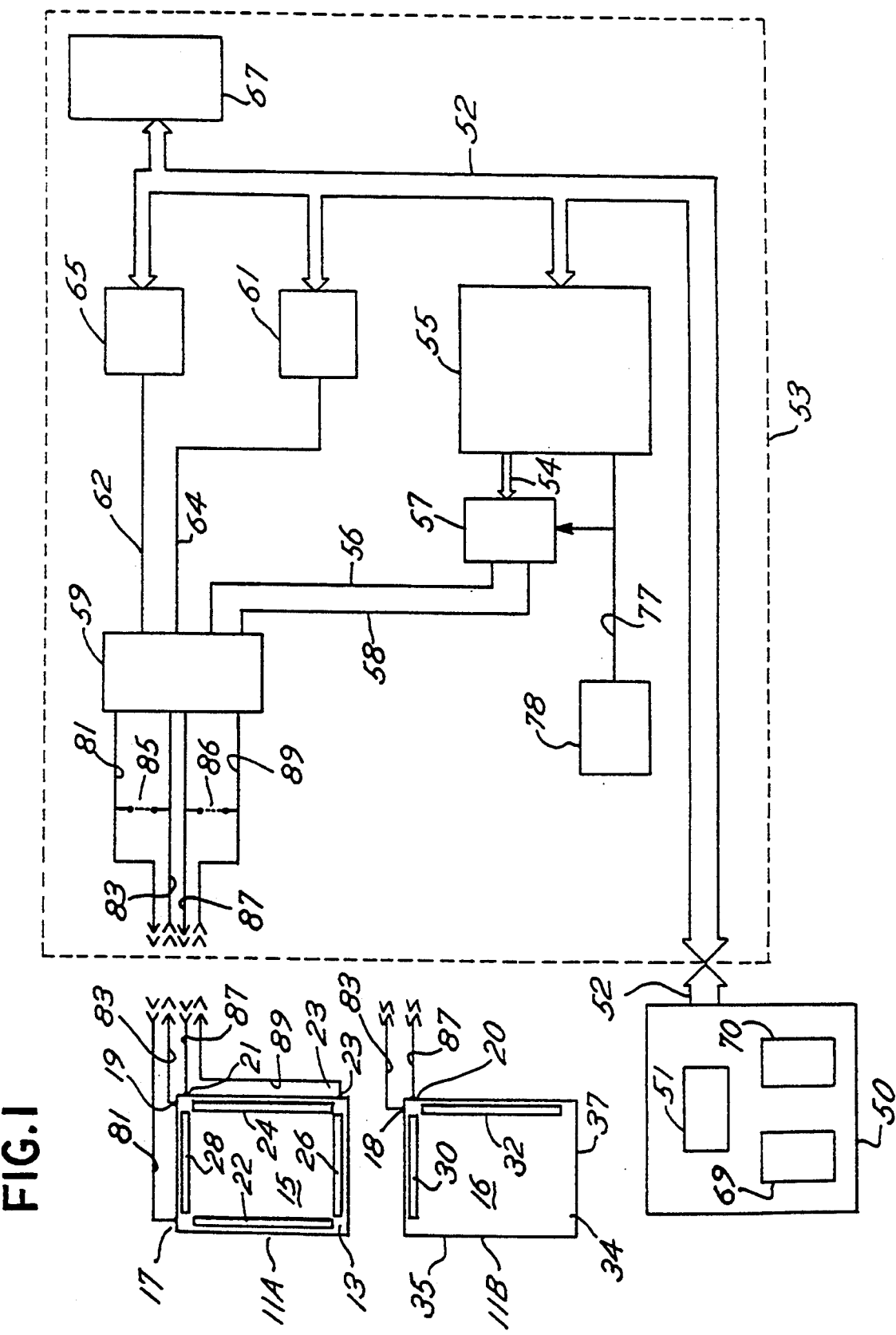
FIG. 1 is a block diagram of the controller of the present invention illustrated with a pair of acoustic wave touch panels.

The controller 53 of the present invention, as shown in FIG. 1, can be formed on a controller card 53 to interface between a host computer 50 and an acoustic wave touch panel 11A or 11B having either four transducers or two transducers respectively. More particularly, the acoustic wave touch panel 11A includes a substrate 13 on which is mounted a transmitting transducer 17 for imparting an acoustic wave into the substrate 13 along an axis of a reflective array 22. The reflective array 22 reflects the imparted acoustic wave along a number of substantially parallel paths across a touch surface 15 of the touch panel to a second reflective array 14. The second reflective array reflects the acoustic waves incident thereto to an X-axis receiving transducer 19. Similarly, the substrate 13 includes a Y-axis transmitting transducer 23 that imparts an acoustic wave into the substrate 13 along the axis of an array 26. The array 26 reflects the acoustic wave along a number of substantially parallel paths across the touch surface 15 to a reflective array 28. The reflective array 28 reflects the acoustic waves incident thereto to a Y-axis receiving transducer 21. The acoustic waves propagating in the substrate 13 are such that a touch on a touch surface of the panel causes a perturbation in the acoustic waves intersecting the touch wherein the perturbation can be detected by the controller 53 so as to determine the X-axis and Y-axis coordinates of the touch. It is noted that the transducers may be mounted on the substrate 13 to impart various types of acoustic waves for propagation in the touch panel substrate including Shear waves, Surface Acoustic waves or Rayleigh waves, Lamb waves, etc. Suitable Shear wave acoustic touch panels and Lamb wave acoustic touch panels are shown in U.S. Pat. No. 5,072,427; in U.S. patent application Ser. No. 07/615,030 filed November 16, 1990, entitled "Acoustic Touch Position Sensor", and assigned to the assignee of the present invention and in U.S. patent application Ser. No. 07/614,860 filed Nov. 16, 1990.

The acoustic wave touch panel 11B is similar to the panel 11A except that only two transducers 18 and 20 are utilized. The transducer 18 is an X-axis transceiver that imparts an acoustic wave into the substrate for propagation along an axis of a reflective array 32. The reflective array 32 reflects the acoustic wave along a number of substantially parallel paths extending across the touch surface 16 of the substrate 34 to a reflective edge 35 of the substrate or to a reflective grating, not shown, disposed in or on the substrate where the grating is capable of reflecting the particular type of acoustic wave utilized. The reflective edge 35 or grating reflects the acoustic waves incident thereto back along the parallel paths to the array 32. The reflective array 32 then reflects the acoustic waves propagating incident thereto back to the X-axis transceiver 18 to provide an X-axis sense signal. Similarly, a Y-axis transceiver 20 is mounted on the substrate 34 to impart an acoustic wave into the substrate 34 for propagation along an axis of a reflective array 30. The reflective array 30 reflects the acoustic wave along a number of substantially parallel paths extending across the touch surface 16 of the substrate 34 to a reflective edge 37 or reflective grating (not shown) for reflection back along the parallel paths to the array 30. The reflective array 30 then reflects the acoustic waves incident thereto back to the Y-axis transceiver which generates a Y-axis sense signal in response thereto. It is noted that, as discussed above with respect to the touch panel 11A, the touch panel 11B may utilize transducers 18 and 20 mounted on the substrate 34 to impart various types of acoustic waves therein including Shear waves, Surface or Rayleigh waves, Lamb waves, etc.

The acoustic wave touch position panel 11A, 11B coupled to the controller 53 is driven by the controller card 53 under the control of the host computer 50 which communicates with the controller card 53 via a bus 52. Although the controller card 53 plugs into an expansion slot such is found in most personal computers, it may also be incorporated as part of the host computer circuitry. The host computer 50 includes a microprocessor 51 which operates in accordance with software stored in a ROM 69 and RAM 70, the RAM 70 also being used as a scratch pad memory for data.

The controller card 53 is responsive to a command from the host computer to initiate an X-axis cycle by applying a burst drive signal to the X axis transducer. The controller thereafter senses, amplifies, demodulates and converts to a digital format the X axis signal for the host computer. Next, the host computer 50 retrieves the X axis signal from the controller 53. After an X-axis cycle has been completed the controller card 53 in response to a command from the host computer 50 initiates a Y axis cycle by applying a burst drive signal to the Y axis transducer. The controller thereafter senses, amplifies, demodulates and converts to a digital format the Y axis signal for the host computer 50. From the X and Y digital data representing the X axis and Y axis sensed signals from the respective transducers, the host computer 50 calculates the X and Y coordinate positions of a touch on the touch panel 11A, 11B.

More particularly, in response to an X channel reading request (or scan cycle request) from the host computer 50, the controller 53 generates an X channel select signal and a burst enable signal along a bus 54 to a burst generator 57. In response to the burst enable signal, using a clock signal produced by a clock oscillator 78 on a conductor 77, the burst generator 57 produces a burst drive signal on an X-burst conductor 56. The burst drive signal is a series of digital pulses having a fifty (50) percent duty cycle at 5 megahertz ("MHz"). After thirty two (32) digital pulses (or cycles) have been generated, the controller 55 removes the burst enable signal from the bus 54. The burst generator 57 responds by removing the burst drive signal from the conductor 56.

A signal conditioning circuit 59 receives and amplifies the burst drive signal prior to application to the touch panel 11A, 11B to generate the X channel acoustic waves. If the four-transducer touch panel 11A is used, jumpers 85 and 86 are removed so that the circuit 59 applies the amplified burst drive signal to the X-channel transmitting transducer 17 via the conductor 81. The transducer 17 responds by generating the X-channel acoustic wave. If, however, the two-transducer touch panel 11B is used, the jumper 85 is inserted into the circuit to electrically connect the conductors 81 and 83 and the jumper 86 is inserted to connect the conductors 87 and 89. In this case the circuit 59 applies the amplified burst drive signal to the X-channel transceiving transducer 18 via the pathway defined by the conductor 81, jumper 85, and conductor 83. In response to the burst drive signal, the transducer 18 generates the X-channel acoustic wave.

Thereafter, either the X-channel receiver transducer 19 or X-channel transceiving transducer 18 senses the reflected acoustic wave and produces the X-axis signal on the conductor 83. The signal conditioning circuit 59 receives and processes the X-axis signal by amplifying, filtering and demodulating the signal before transmitting the processed X-axis signal along a conductor 62 to an analog-to-digital ("A/D") converter 65. Most importantly, the circuit 59 receives and processes the X-axis and the Y-axis sense signals simultaneously even though only an X-axis signal is expected. The Y-axis sense signal is effectively subtracted from the X-axis sense signal using common mode rejection techniques. Both inherent circuit noise and spurious vibrations common to both channels including spurious acoustic waves sensed by both the X and Y receiving transducers are thereby removed. This common mode rejection also occurs when the Y-axis sense signal is expected, by effectively subtracting the X-axis sense signal. Using common mode rejection techniques, the desirable channel signal is selected, enhancing the detectability of the touch. It is noted that because common mode rejection techniques are utilized, the receiving transducers 19 and 21 of the panel 11A or the transceivers 18 and 20 of the panel 11B should be mounted on the touch panel as close as possible and preferably equidistant to a diagonal extending between the transducers and at a 45° angle with respect to the X and Y axes. Further the circuitry associated with the X-axis and Y-axis channels should be symmetrical and in close proximity as will be apparent to one of ordinary skill in the art.

The X-axis sense signal is further processed to remove the burst drive signal therefrom, providing an envelope waveform. The A/D converter 65 receives, samples and converts the processed X-axis sense signal into a digital form, the digital data representing the X-axis sense signal being stored in a RAM 67. The sampling and conversion time of the A/D converter 65 is very short as compared to the 5 MHz burst rate so as to adequately represent the processed X signal in a digital form.

After the circuit 59 receives and processes the X-axis signal, the controller 55 repeats this process for the Y channel. In particular, the burst generator 57 produces a burst drive signal on a Y-burst conductor 58. The circuit 59 receives and amplifies the Y-burst drive signal and applies the burst drive signal to the touch panel 11A, 11B to generate the Y-axis acoustic waves. When the panel 11A is used, the circuit 59 applies the amplified burst drive signal to the Y-channel transmitter transducer 21 via the conductor 87. When the panel 11B is used, the circuit 59 applies the amplified burst drive signal to the Y-channel transceiving transducer 20 via the conductor 87. Thereafter either the Y-channel receiver transducer 23 or Y-channel transceiving transducer 20 senses the acoustic waves incident thereto and produces the Y-axis signal upon the conductor 89 either directly or via the conductor 87 and jumper 86. The circuit 59 processes the Y-axis sense signal, which includes rejecting the common mode X-axis sense signal, and transmits the processed Y-axis sense signal to A/D converter 65. The A/D converter 65 receives, samples and converts the processed Y-axis sense signal into a digital form, the digital data representing the Y-axis sense signal being stored in the RAM 67.

After the X and Y signals have been stored, the host computer 50 retrieves the signals in order to determine a position of a touch as described for example in U.S. patent application Ser. No. 07/615,030 previously incorporated herein by reference. It is noted that even though the RAMS 67 and 70 are separately located, the RAM 67 can be combined as part of the RAM 70 such that the controller 55 may directly store to the RAM 70, removing the need to transfer data between the two memories.

The host computer 50 monitors the level of the X and Y signals received from the storage RAM 67, and responds by adjusting the gain of the amplifier portion of the circuit 59 whenever necessary to optimize the detection of the perturbations. Although the "gain" to be adjusted may be the gain associated with the burst drive signal, in the preferred embodiment, it is the gain associated with the amplification of the sensed acoustic wave. Particularly, the host computer 50 transmits a digital gain signal representing a specific gain level to a digital-to-analog ("D/A") converter 61 via the bus 52. The D/A converter 61 responds by converting the digital gain signal into an analog form and applying the analog signal to the circuit 59 via a conductor 64, setting the gain of the X and Y sense amplification.

The host computer 50 sends a scan cycle command, retrieves the X-axis and Y-axis sense signals and determines whether to adjust the gain. If an adjustment needs to be made, the host computer 50 sends a new gain signal followed by another scan cycle command and another determination. This feedback process repeats until the host computer 50 determines that an optimal gain value has been reached. The process is re-initiated when necessary.

Particularly, the host computer 50 identifies the optimal gain value by analyzing the X and Y signals retrieved from the storage RAM 67. The optimal gain value is that value which causes retrieved X and Y signals to be amplified as great as possible without ever exceeding the capability of the A/D converter 65. For example, using an A/D converter 65 with 8-bit resolution—which has a maximum possible output is $2^8-1$ or 255 least significant bits, the optimum gain value is that gain which results in the largest digital sample of the X or Y signal being some safety margin less than 255 LSB's. With a safety margin of 20 LSB's, for example, the optimum gain would adjust the largest digital sample to 235 LSB's. If the largest digital sample is greater than 235 LSB's, the host computer 50 adjusts the gain value down and re-sends the scan command. If the largest digital sample is less than 235 LSB's, the host computer 50 adjusts the gain value up. In this manner, the host computer 50 tracks and maintains the optimum gain value.

Figure 2:
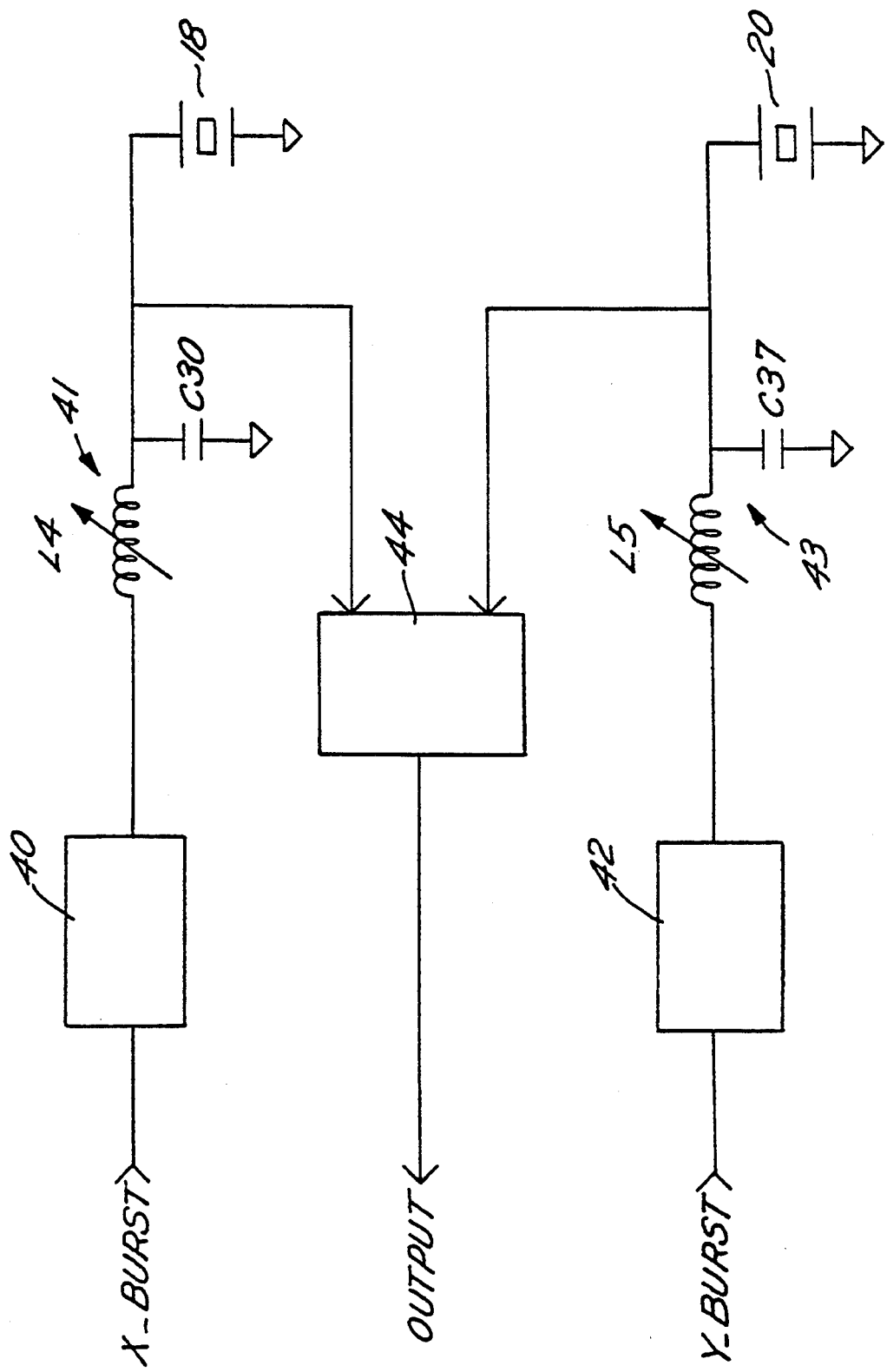
FIG. 2 is a block diagram of the signal conditioning circuit in accordance with the present invention as shown in FIG. 1.

The signal conditioning circuit 59 is illustrated in block diagram form in FIG. 2. The circuit 59 includes a resonant circuit 41 in the X channel and a resonant circuit 43 in the Y channel. The resonant circuit 41 includes an inductor L4 and a capacitor C30 whereas the resonant circuit 43 includes an inductor L5 and a capacitor C37 as described in detail below. The X-axis burst signal from the burst generator is applied to the switching circuit 40 which is controlled to toggle between the power supply voltage and ground to apply a burst signal to the resonant circuit 41 which forms a series resonant circuit through which the X-axis burst signal is applied to the transceiver 18 of the panel 11B. When the circuit is to receive the X-axis sense signal, however, from the transceiver 18, the switching circuit 40 ties the output thereof to ground so that the resonant circuit 41 forms a high impedance parallel resonant circuit for the incoming X-axis sense signal.

Similarly, the Y-axis burst signal from the burst generator is applied to the switching circuit 42 which is controlled to toggle between the power supply voltage and ground to apply a burst signal to the resonant circuit 43 which forms a series resonant circuit through which the Y-axis burst signal is applied to the transceiver 18 of the panel 11B. When the circuit is to receive the Y-axis sense signal, however, from the transceiver 20, the switching circuit 42 ties the output thereof to ground so that the resonant circuit 43 forms a high impedance parallel resonant circuit for the incoming Y-axis sense signal so as not to affect the receipt of the sense signal.

The X-axis sense signal and the Y-axis sense signal are applied to a differential device 44 which may take the form of a differential amplifier 151 as described in detail below with respect to FIG. 5. The differential device provides an output signal representing the difference between the two input signals. The output of the differential device 44 represents the sense signal associated with the axis for which the burst drive signal was just applied to the touch panel, common mode noise from the other channel being eliminated from the output signal of the differential device 44.

Figure 3:
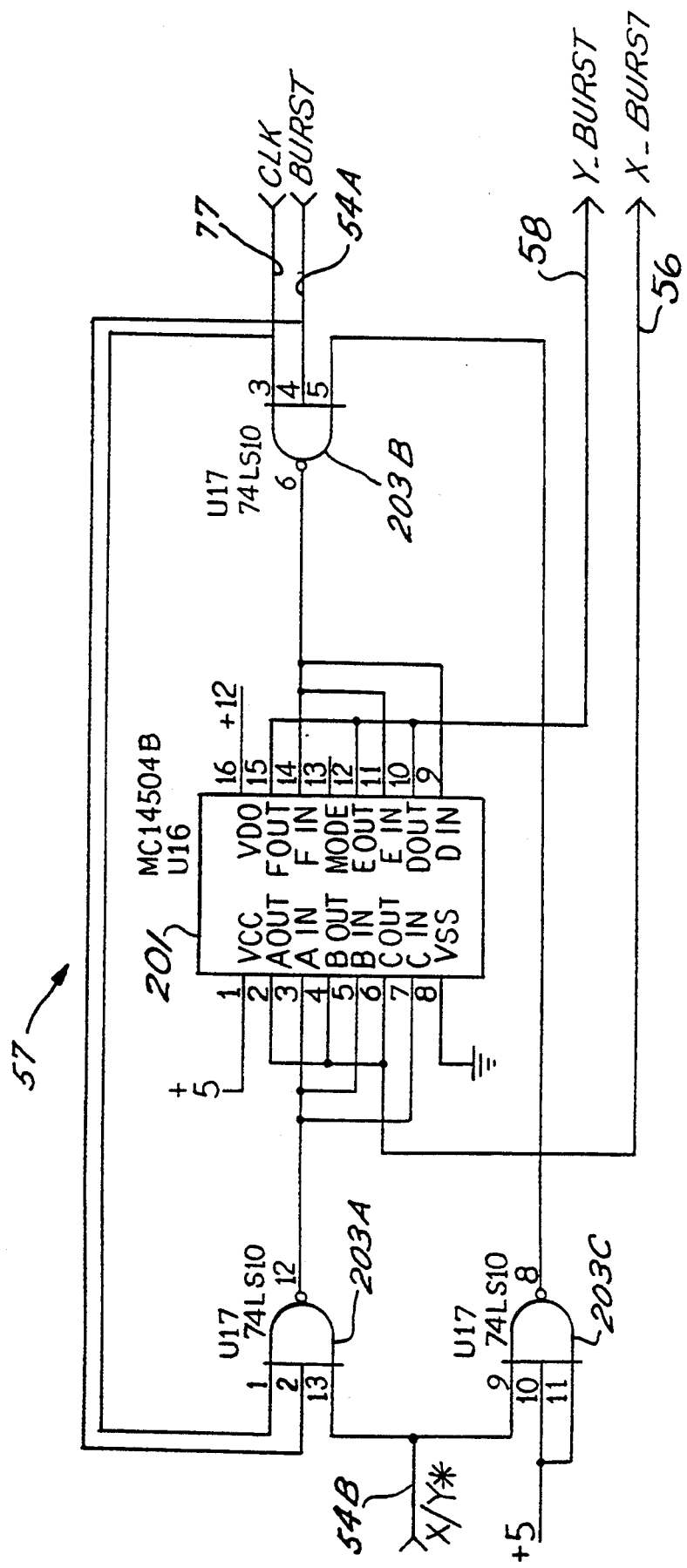
FIG. 3 is a schematic diagram of a burst generator illustrated in FIG. 1.

FIG. 3 is a more detailed schematic diagram of the burst generator 57 illustrated in FIG. 1. Specifically, the burst generator 57, which responds to the controller 55 to provide either the X or the Y channel burst signals, is constructed from a level shifter 201 (a MC14504B chip) and NAND gates 203A, 203B and 203C. The burst generator 57 provides a burst signal along either X-burst or Y-burst conductors 56 and 58, respectively, whenever a burst enable signal is received on a conductor 54A. If an X-channel select signal is placed upon an X/Y* conductor 54B, the NAND gate 203A selects the X-burst conductor 56. If instead a Y-channel select signal is placed upon the conductor 54B, the NAND gate 203B selects the Y-burst conductor 58. The clock signal, originating from the clock oscillator 78, sets the frequency of the burst, while the duration of the burst is controlled by the controller 55. Particularly, the controller 55 ends the burst by removing the burst enable signal from the conductor 54A.

FIGS. 4A-E are more detailed schematic diagrams of the controller illustrated in FIG. 1. Referring to FIG. 8, the host computer 50 gains access to the controller 55 by placing the address of the controller card 53 on address conductors A3-A9 of the HOST ADDRESS BUS, and by generating an AEN (address enable) signal. A comparator 111 (a 74LS688) compares the address on the conductors A3-A9 and the AEN signal with a digital code set by a plurality of jumpers W5-W11 at 113. In response to a proper address, the comparator 111 generates a controller card select signal, SELECT*, that permits access to the controller card 53.

Specifically, the SELECT* signal is sent to a pair of OR gates 115, 117 to permit either read or write operations to be initiated by the host computer 50. If a read operation is to be initiated, the host computer 50 generates additional command signals to cause an acoustic wave scan of the panel 11, resulting in the processing of X-axis or Y-axis sense signals and the storage of data representative thereof in the RAM 67 from which the data is then read into the RAM 70. If a write operation is to be initiated, the host computer 50 generates additional command signals for a digital gain value to the D/A converter 61. The controller 55 responds to the command signals from the host computer 50 by generating a plurality of control signals at appropriate times in order to effectuate the write operation.

Particularly, the host computer 50 generates control signals IOWR and IORD. These signals, together with the signals on address conductors A0 and A1 of the HOST ADDRESS BUS and a developed DONE signal (see FIG. 9), are sent to a buffer 119 where control signals ID0, BA0, BA1, WR* and RD* are developed. The BA0 and BA1 are equal to the logic signals placed on address conductors A0 and A1, respectively. The control signal RD* and WR* are equal to the IORD and IOWR signals generated by the host computer 50. Similarly, the ID0 control signal is equal to the signal generated on the DONE conductor.

The RD* is input to the OR gate 115 and is used to generate control signals RSTAT and RDD from a decoder/demultiplexer 121. When RD* is at a high logic level (HIGH or H), RSTAT and RDD are HIGH. If RD* is at a low logic level (LOW or L), then RSTAT and RDD are determined by input values BA1 and BA0 according to the following table:

| BA0 | BA1 | RDD | RSTAT |
|---|---|---|---|
| L | L | L | H |
| H | L | H | L |
| L | H | H | H |
| H | H | H | H |

The control signal WR* is equal to the IOWR signal generated by the microprocessor. The WR* is input to the OR gate 117 and is used to generate a counter reset signal (CTRRST), a CK signal and a CH signal via a decoder/demultiplexer 123. A START signal is in turn generated by the CH signal. When WR* is LOW, then CTRRST, CK and CH are determined by input values BA1 and BA0 according to the following table:

| BA0 | BA1 | CTRRST | CLK | CH |
|---|---|---|---|---|
| L | L | L | L | L |
| H | L | H | H | L |
| L | H | L | H | H |
| H | H | L | H | L |

The host computer 50 places data onto the HOST DATA BUS on conductors D0-D7 (shown in FIG. 10) for writing data to the D/A converter 61 as well as to generate the channel select signal on the X/Y* conductor 54B. Specifically, the data from the HOST DATA BUS conductors D0–D7 passes to INTERNAL DATA BUS conductors ID0–ID7 via an octal bus transceiver 157. The data on the INTERNAL DATA BUS conductors ID0–ID7 is latched in the flip-flops 127 upon the CK signal. Thus, the select signal on the X/Y* conductor 54B is latched to the same value as the D0 signal generated on the HOST DATA BUS by the host computer 50. Similarly, LATCHED GAIN VALUE conductors DA6–DA0 assume the state of HOST DATA BUS D1–D7, respectively. The conductors DA6–DA0 contain the digital gain value for use by the circuit 59.

A flip-flop 125 receives the CH signal and the clock signal (CLK) on the conductor 77 for generating the START signal. The START signal is generated on the positive going edge of the CLK signal.

Figure 4A:
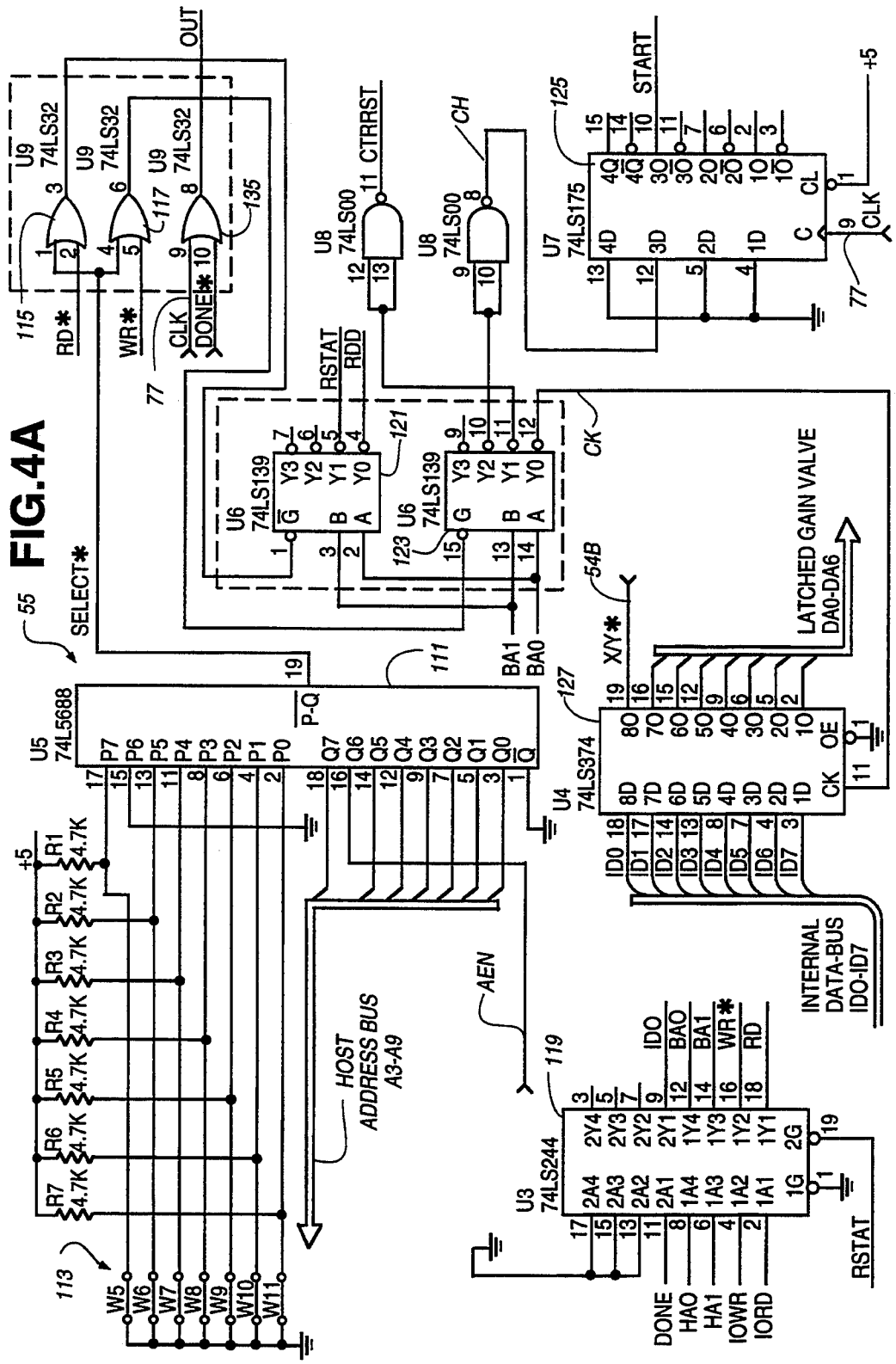
FIGS. 4A-E form a schematic diagram of the controller circuitry utilized with the signal conditioning circuit.
Figure 4B:
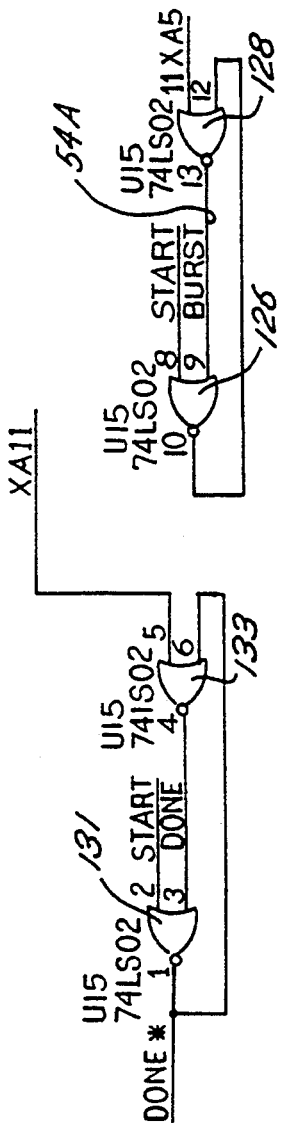

The control logic signals generated by the controller 55 are those necessary to control burst generator 57 during a read operation in order to initiate a burst output of a determined duration at either the X-axis transducer or the Y-axis transducer. As shown in FIG. 4B, the burst enable (BURST) signal is generated on the conductor 54A by a pair of NOR gates 126, 128. The BURST signal goes HIGH upon the generation of the START signal. The BURST signal terminates and returns to a logic LOW upon the XADDR_BUS conductor XA5 going logically HIGH. The conductor XA5 goes HIGH after 32 counts of an address counter 129 (FIG. 4C) described hereinafter. Thus, the host computer 50 generates IOWR, A0 and A1 control signals in order to first write a select value onto the X/Y* conductor 54B via the buffer 127, selecting the X-axis or Y-axis transducers, and then secondly to start the burst output from the burst generator 57 to the selected transducer.

Figure 4D:
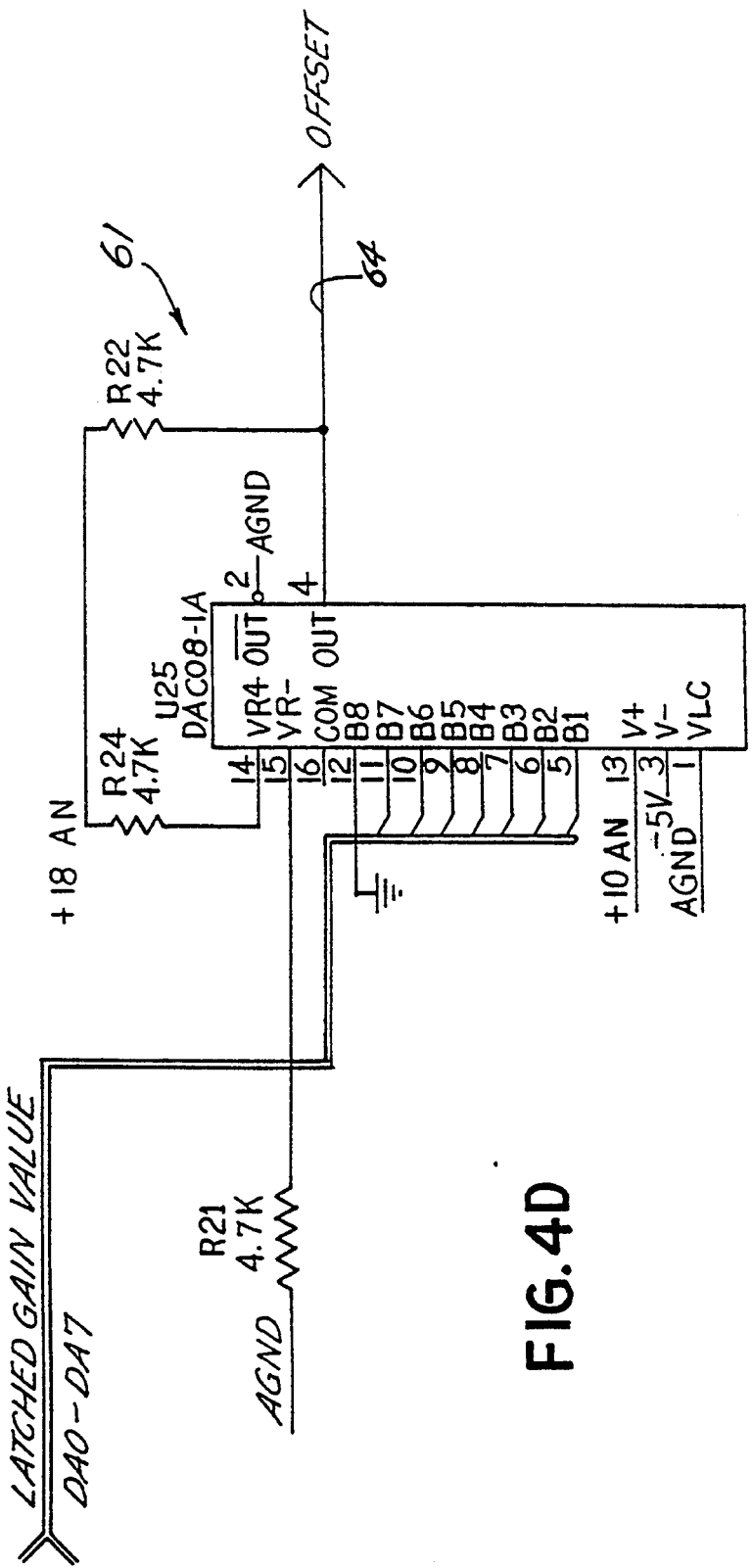
Figure 4C:
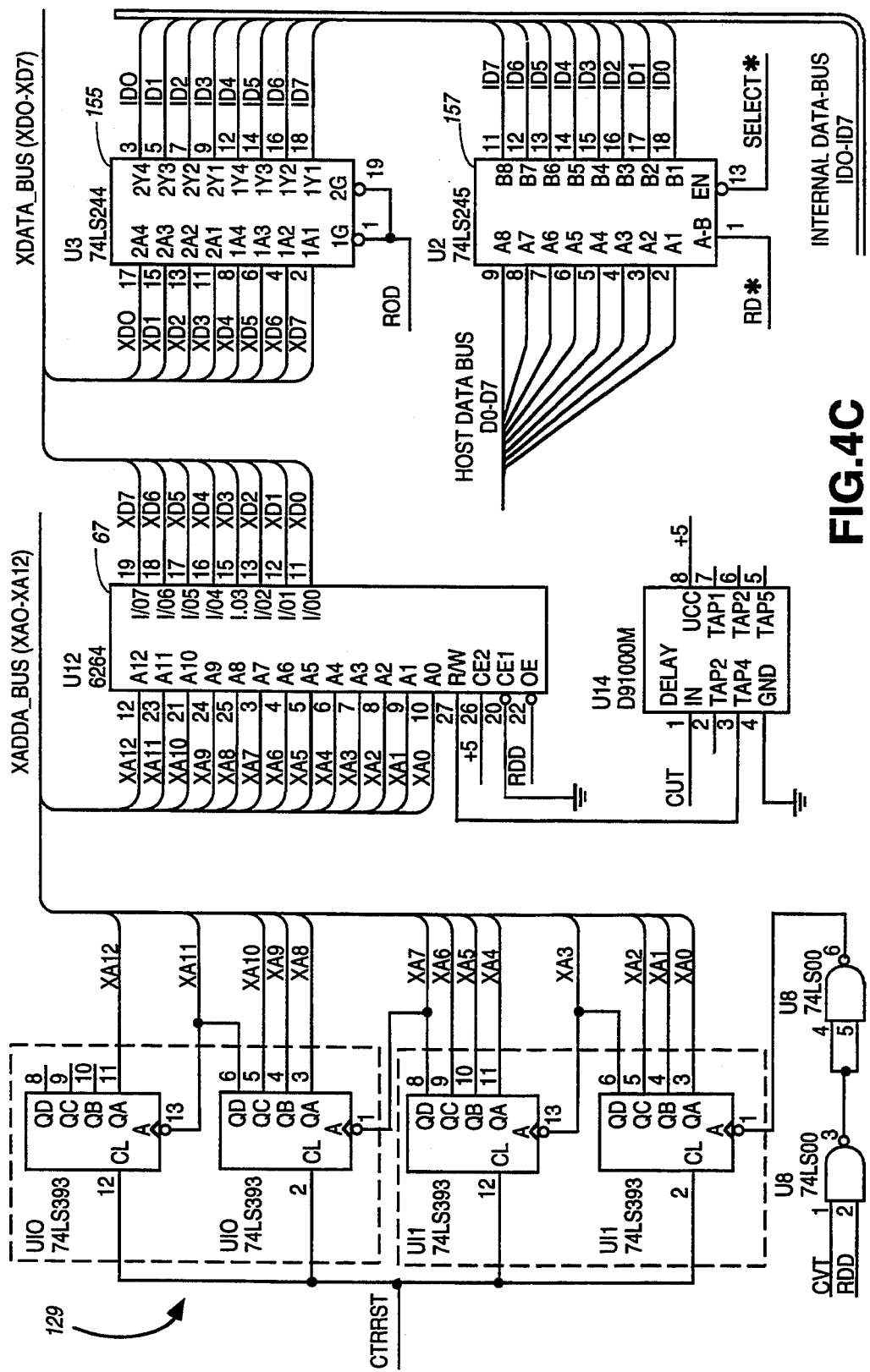
Figure 4E:
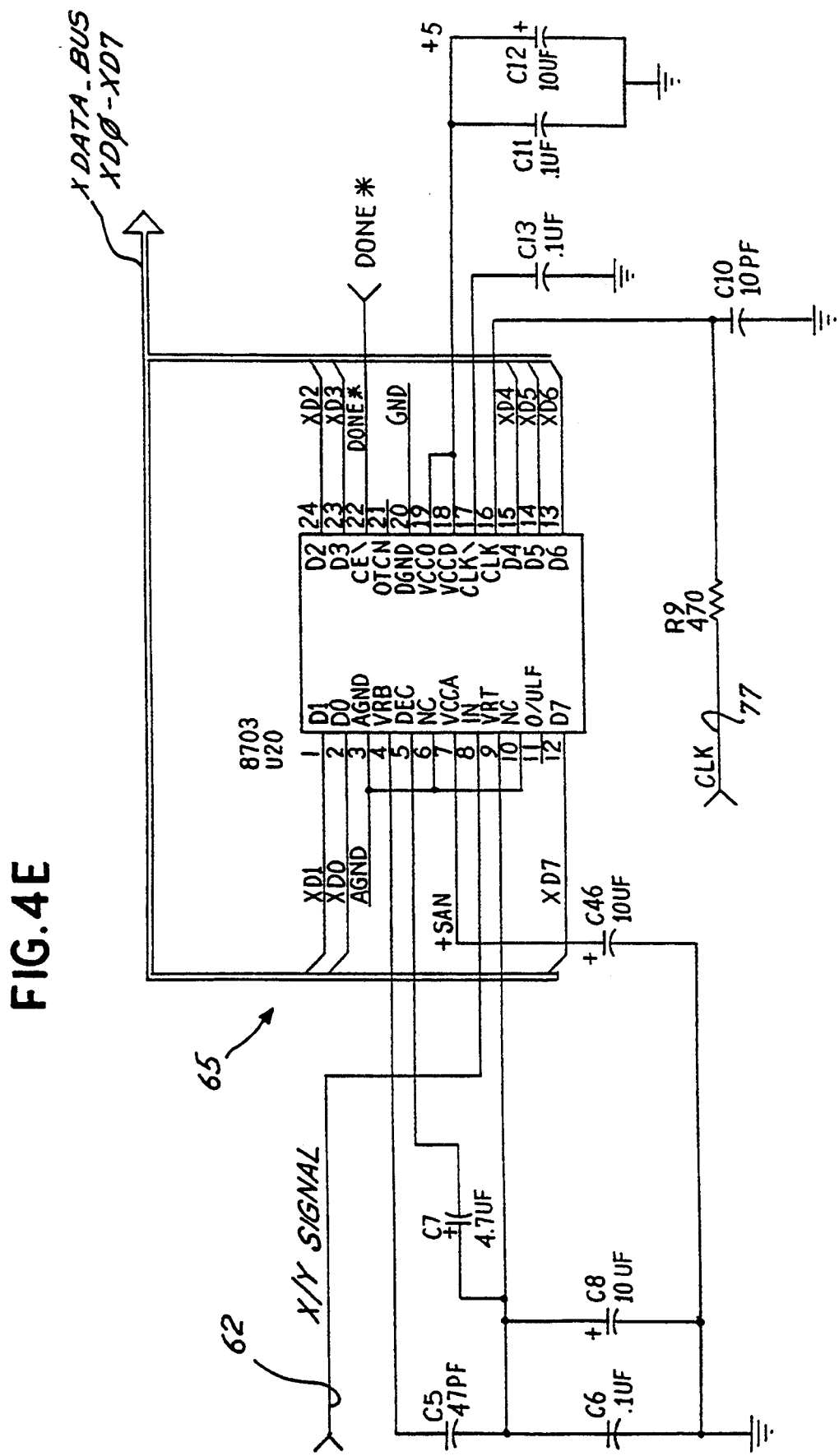

FIG. 4E is a more detailed schematic diagram of the A/D converter 65 illustrated in FIG. 1. The sense signal X-axis or the Y-axis sense signal which has been amplified, filtered and demodulated by the circuit 59 is input as an X/Y SIGNAL via the conductor 62 to the A/D circuit 65. Specifically, an A/D converter (Chip 8703) receives the X/Y SIGNAL and generates output digital signals onto XDATA_BUS conductors XD0–XD7.

As shown in FIG. 4C, the data on the XDATA_BUS conductors XD0–XD7 is fed to the RAM 67 (chip 6264) for storage in the address defined by an address signal appearing on XADDR_BUS conductors XA0–XA12. Addresses are generated by an address counter 129 in timed sequence with the A/D converter 65. The counter 129 counts according to the negative going edges of a CVT signal. The RDD signal must be kept HIGH to permit the CVT signal to increment the counter 129.

Returning to FIG. 4B, the NOR gates 131, 133 serve to develop a DONE signal and a DONE* signal, both of which are initiated by the START signal and terminated by a signal on the XADDR_BUS conductor XA11. The conductor XA11 goes HIGH at count 2048 of the address counter 129 (FIG. 10). The DONE* signal is used to generate the RAM clocking signal CVT via an OR gate 135 (FIG. 8). The CVT signal controls the storage of digital data by the RAM 67 (FIG. 10) in conjunction with the RDD signal. At the start of the read operation, the host computer 50 holds the IORD signal HIGH, keeping the RDD signal HIGH. With the RDD signal HIGH, the counter 129 begins counting upon the generation of the START signal.

As shown in FIG. 4C, the counter rest signal CTRRST serves to reset counter 129. The CTRRST signal is generated under control of the host computer 50 via the IOWR, A0 and A1 signals. As shown in FIG. 4A, the CVT signal, which serves as a clock for driving counter 129, is terminated upon generation of the DONE* signal, i.e., at count 2048. As shown in FIG. 4B, the DONE* signal is turned OFF upon generation of the START signal and then turned ON when the counter 129 reaches a count of 2048. This serves to terminate the CVT signal via the OR gate 135 and thus the counter stops counting at count 2048.

Returning to FIG. 4C, data is transferred to and from the host computer 50 via the octal bus transceiver 157. The transceiver 157 is enabled by the controller card SELECT* signal. The RD* signal controls the direction of data transfer. If the RD* is HIGH, data is transferred from the host computer 50 to the controller board 53. If the RD* is LOW, data is transferred to the host computer 50 from the controller board 53. More specifically, the transceiver 157 provides a single direction data pathway between the HOST DATA BUS and the INTERNAL DATA BUS if the controller card 53 is being selected (via the SELECT* signal). The RD* signal controls the direction of the pathway.

Upon the counter 129 reaching a count of 2048, the storage in the RAM 67 of the 2048 digital samples of the shear wave data is complete. The host computer 50 then reads the data from the RAM 67 via a buffer 155 and the transceiver 157. The counter 129 is reset by generation of the CTRRST signal, which in turn changes the XA5 and XA11 signals in the logic circuitry of FIG. 4B so that the CVT clocking circuit directly drives the counter 129 and the RAM 67. A delay circuit U14 (D51000M chip) delays the CVT to the RAM 67 to ensure that the proper address stabilizes before reading (or writing) data from the RAM 67. When counter 129 reaches count 2048, the reading of the RAM 67 terminates.

The signal ID0 is the buffered version of the DONE signal at the tri-state flip-flops 119 (FIG. 4A). ID0 assumes the state of DONE when the RSTAT control signal is driven LOW. When RSTAT is HIGH, the ID0 conductor floats. This is significant since ID0 is connected via another LS244 buffer 155 (FIG. 4C) to the XDATA BUS from the RAM 67 and A/D converter 65, and is also connected via the transceiver 157 to the HOST DATA BUS conductor D0.

In addition, the data placed on the LATCHED GAIN VALUE conductors DA0–DA6 (as latched by the flip-flops 127) is transmitted to the D/A converter 61, as shown in FIG. 4D. From the data on the conductors DA0–DA6, the D/A converter 61 (a DAC08 chip) generates an automatic gain control voltage as the OFFSET signal on the conductor 64. The OFFSET signal is applied to the circuit 59. Specifically, the offset signal on the conductor 64 is applied to adjust the gain of an IF AGC amplifier 151 (an MC1350 chip), as shown in FIG. 5A.

Figure 5A:
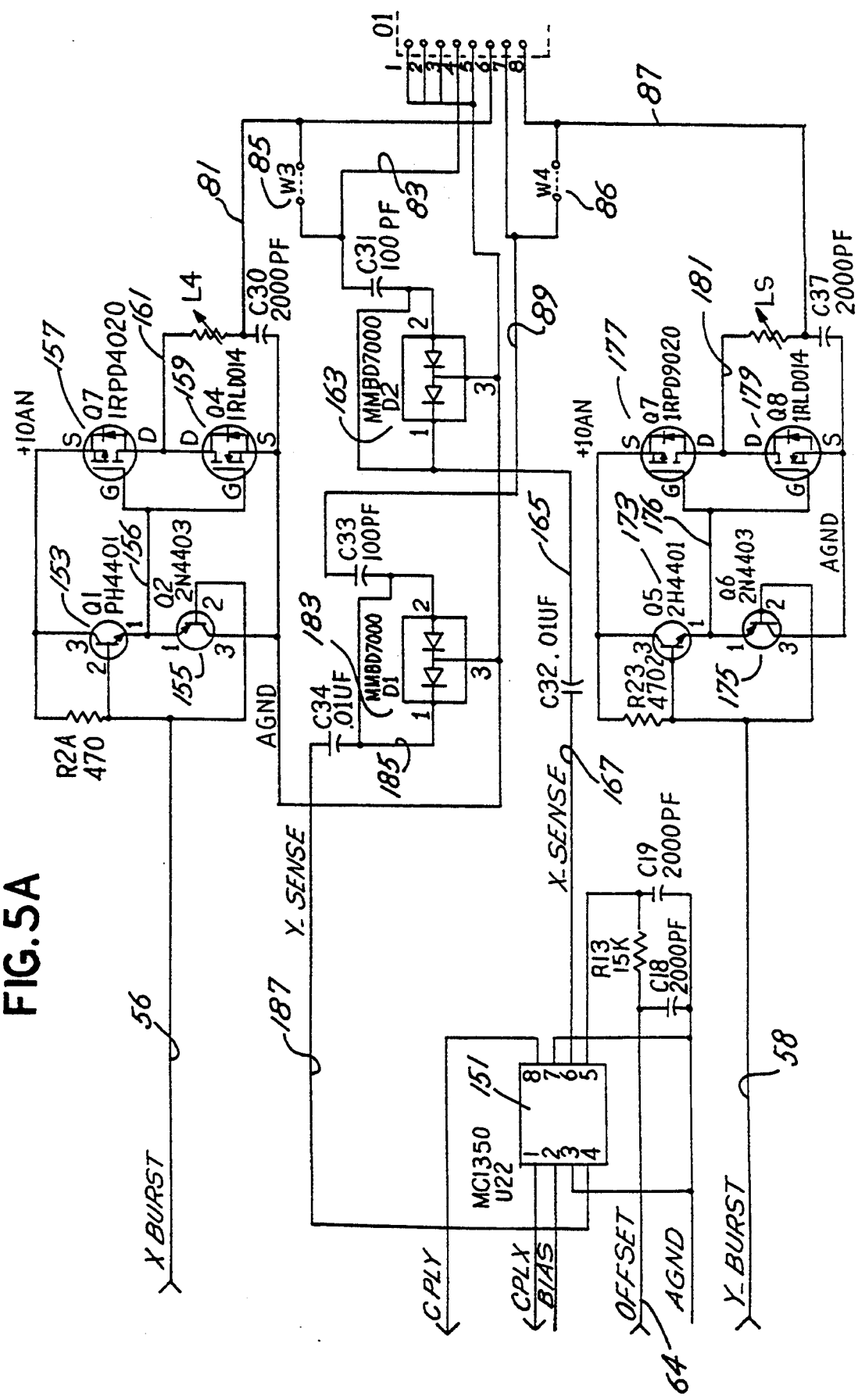
FIGS. 5A-B form a schematic diagram of the signal conditioning circuit of the present invention.
Figure 5B:
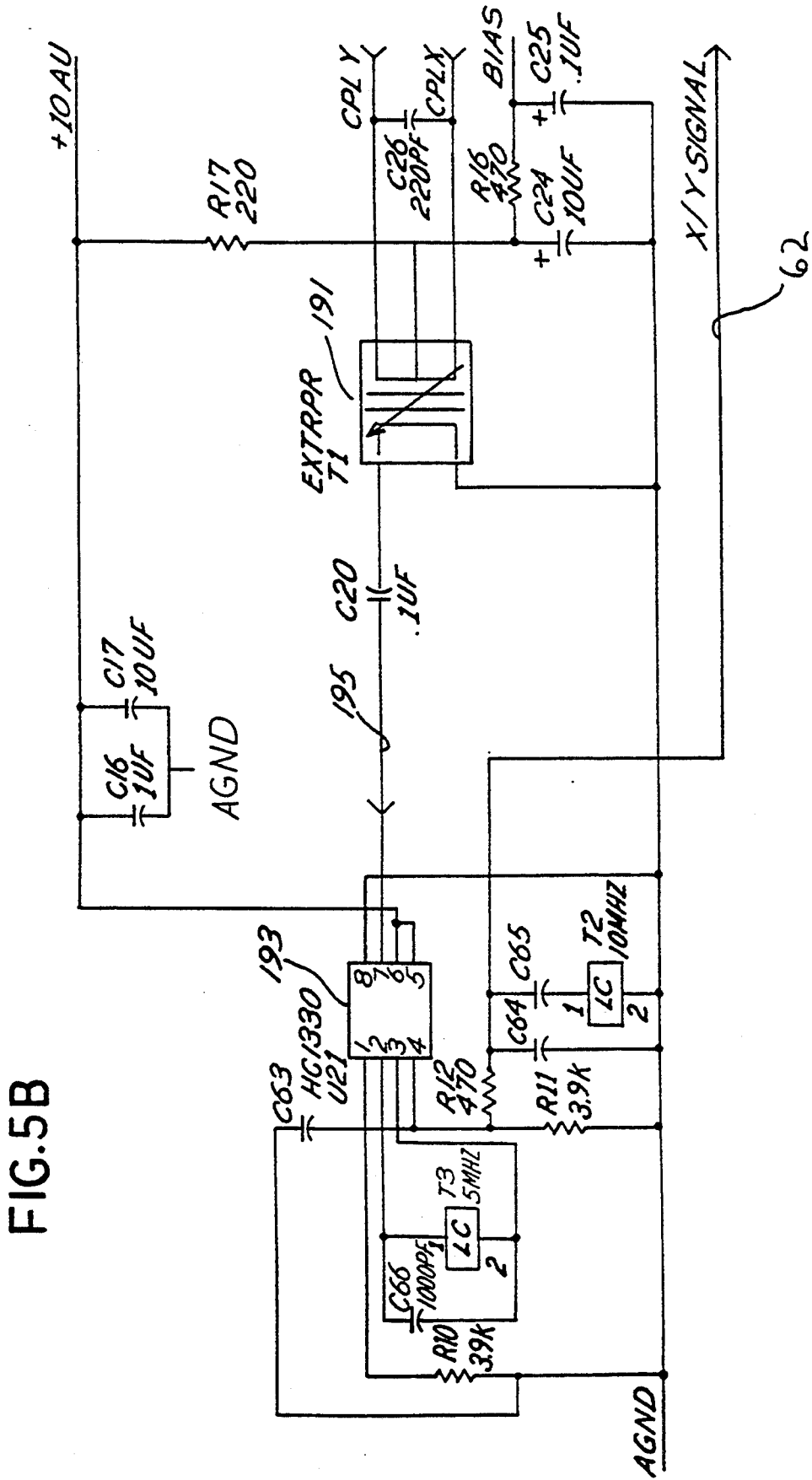

FIGS. 5A and 5B form a schematic diagram of the signal conditioning circuit 59 shown in FIGS. 1 and 2. Referring to FIG. 5A, the X-BURST signal from the burst generator 57 appears along the conductor 56 through a pair of transistors 153, 155 which are arranged in a complementary emitter-follower push-pull configuration. This configuration provides very fast switching characteristics responsive to the X-burst signal. The transistors 153 and 155 provide a square wave version of the X-BURST signal on a conductor 156. A pair of MOSFET switches 157, 159 (IRFD9020 and IRLD014, respectively), connected in a complementary arrangement, respond to the X-BURST signal on the conductor 156 by providing a very low source resistance pathway from a conductor 161 to either analog ground (AGND) or a corresponding +10 Volt supply (+10 AN). Thus, the signal on the conductor 161 inversely tracks the X-BURST signal on the conductor 56.

The signal on the conductor 161 drives the resonant circuit comprising the inductor L4 and the 2000 picofarad capacitor C30, the resonant circuit forming a series resonant circuit through which the X-burst signal is applied to the X-axis transmitting transducer 17, 18. Responding to the 5 MHz toggling of the signal on the conductor 161 between +12 AN and AGND, the resonant circuit boosts the +12 volts from the +12 AN supply to 150 volts or more, peak-to-peak, on the conductor 81. The X-axis transmitting transducer 17, 18 responds by imparting an acoustic wave into the respective touch panel 11A, 11B. If the touch panel 11B is used, the jumper 85 provides a sensing pathway from the conductor 81 to the differential amplifier 151. A diode pair 163 (MMBD7000), however, protects the amplifier 151 by clamping the high-voltage peak-to-peak signal received. In addition, because the diodes are driven on, the capacitance added by the sensing pathway is small in comparison to the capacitance of the transmitting pathway. Therefore, the Q-factor associated with the series resonant transmitting pathway is not greatly effected.

The incoming signal representative of the acoustic waves developed in the touch panel 11B is input from the transceiving transducer 18 through the conductor 81, jumper 85, conductor 83, and a sensing pathway to the differential amplifier 151. If, however, the panel 11A is used, the incoming signal passes from the receiving transducer 19 through the conductor 83 and a sensing pathway. The sensing pathway includes a capacitor C31 (100 picofarad), a conductor 165, a capacitor 32 (0.01 microfarad) and an X_SENSE conductor 167. The diode pair 163 is not driven on when sensing; therefore, using either panel 11A or 11B, the reactance of the sensing pathway is low in comparison with the input impedance of the AGC amplifier 151, yielding low signal loss.

Immediately after the X-BURST signal has been removed from the conductor 56, the MOSFET switch 159 provides a continuous low channel resistance pathway to AGND for the conductor 161. Although this pathway has little relevance when using the touch panel 11A, using the two-transducer configuration of the panel 11B, this pathway to AGND provides a parallel-resonant circuit of high impedance, tuning out the cable and transducer capacitance from the incoming signal.

Similarly, the Y-BURST signal on the conductor 58 drives a pair of transistors 173, 175. The transistors 173, 175 in turn drive a pair of MOSFET switches 177, 179 along a conductor 176. The MOSFET switches 177, 179 drive a series-resonant pathway from a conductor 181 to the transducer 21 or 20. The inductor L5 and the capacitor C37 (2000 picofarad) form thins series-resonant pathway when the circuit is in the Y-axis drive signal generation mode. As in the X channel, the sensing pathway is governed by the jumper 86 (if used), the conductor 89, a capacitor C33 (100 picofarad), a conductor 185, a capacitor C34 (0.01 microfarad) and a Y_SENSE conductor 187.

A differential amplifier 151 receives the X-axis and Y-axis sense signals from the X-axis and Y-axis receiving transducers on respective X_SENSE and Y_SENSE conductors 167 and 187, simultaneously. The differential amplifier 151 provides a signal CPLX representing the difference between the X-axis sense signal and the Y-axis sense signal during the X-axis sense mode. The differential amplifier 151 further provides a signal CPLY representing the difference between the Y-axis sense signal and the X-axis sense signal during the Y-axis sense mode. Because both the X and Y channels simultaneously sense, spurious vibrations in the touch, panel 11A, 11B along with other common circuit noise can be eliminated by the differential amplifier 151.

Referring to FIG. 5B, the conductors CPLX and CPLY are input to an isolation transformer 191 which provides an output to a demodulator 193 (an MC1330 chip) through a capacitor C20 (0.1 microfarad) and a conductor 195. The demodulator 193 demodulates the resulting difference signal, sending the demodulated signal along the conductor 62 to the A/D converter 65 so that it may be converted to a digital format and stored in the RAM 67. The demodulated signal can represent either an X-axis sense signal or a Y-axis sense signal, the signal being labeled as the X/Y SIGNAL in FIG. 5B. The signal on the conductor 195 might also be sent directly along the conductor 62 to the A/D converter 65, possibly sampling at a higher rate, for conversion, storage, and transfer to the host computer 50. Once transferred, the host computer 50 might conduct digital demodulation, alleviating the need for the demodulator circuit shown in FIG. 5B.

The signal conditioning circuit 59 of the controller of the present invention provides X and Y axis sense signals that have been processed using common mode rejection techniques to eliminate common circuit noise and common noise associated with the touch panel such as resulting from spurious acoustic waves that impinge on both the X-axis and Y-axis receiving transducers. Further, the use of the resonant circuit formed by the inductor L4 and capacitor C30 and the resonant circuit formed by the inductor L5 and capacitor C37 provide a series resonant path for the respective X-axis and Y-axis burst signals while providing a parallel path of high impedance for the respective incoming X-axis and Y-axis sense signals. Many modifications and variations of the embodiment disclosed herein incorporating the present invention are possible in view of the above teachings. Thus it is to be understood that, within the scope of the appended claims, the invention may be practiced otherwise than as described hereinabove.

I claim:

1. A signal conditioning circuit for an acoustic wave touch panel having a substrate, X axis transducer means for imparting acoustic waves into said substrate for propagation therein relative to an associated X axis, said X axis transducer means receiving acoustic waves incident thereto to generate an X axis signal representing sensed acoustic waves from which an X axis coordinate of a touch on said panel can be determined and a Y axis transducer means for imparting acoustic waves into said substrate for propagation therein relative to an associated Y axis said Y axis transducer means receiving acoustic waves incident thereto to generate a Y axis signal representing sensed acoustic waves from which a Y axis coordinate of a touch on said panel can be determined, said circuit comprising:

means for applying a drive signal to one of said X-axis or Y-axis transducer means to impart an acoustic wave in said substrate with respect to the axis associated with the driven transducer;

means for simultaneously receiving a sensed X axis signal and a sensed Y axis signal from said respective X axis and Y axis transducer means; and differential means coupled to said receiving means for providing a signal representing the difference between said simultaneously received signals, said difference signal corresponding to said sensed acoustic waves propagating relative to the axis associated with said one driven transducer to allow a touch coordinate for said axis to be determined.

2. A signal conditioning circuit for a touch panel is recited in claim 1 wherein each of said X axis and Y axis transducer means includes a transmitting transducer and a receiving transducer, said X axis and Y axis receiving transducers being disposed adjacent to each other on said substrate.

3. A signal conditioning circuit for a touch panel as recited in claim 1 wherein each of said X axis and Y axis transducer means includes a transceiver for imparting acoustic waves into said substrate and for receiving acoustic waves incident thereto, said X axis and Y axis transceivers being mounted adjacent to each other on said substrate.

4. A signal conditioning circuit for a touch panel as recited in claim 3 including a resonant circuit disposed between said X axis transceiver and said means for receiving said sensed X axis signal, said resonant circuit forming a series resonant circuit through which said drive signal is applied to said X axis transceiver and said resonant circuit forming a parallel resonant circuit when said receiving means receives said sensed X axis signal.

5. A signal conditioning circuit for a touch panel as recited in claim 4 including means for switching said resonant circuit to form said series resonant circuit or said parallel resonant circuit.

6. A signal conditioning circuit for a touch panel as recited in claim 3 including a resonant circuit disposed between said Y axis transceiver and said means for receiving said sensed Y axis signal, said resonant circuit forming a series resonant circuit through which said drive signal is applied to said Y axis transceiver and said resonant circuit forming a parallel resonant circuit when said receiving means receives said sensed Y axis signal.

7. A signal conditioning circuit for a touch panel as recited in claim 6 including means for switching said resonant circuit to form said series resonant circuit or said parallel resonant circuit.

* * * * *